United States Patent [19]

Hahn et al.

[11] 4,118,718
[45] Oct. 3, 1978

[54] MEASURING AND CONTROL SYSTEM FOR SINGLE LENS REFLEX

[75] Inventors: Werner Hahn; Heinz Schulze, both of Dresden, German Democratic Rep.

[73] Assignee: VEB Pentacon Dresden Kamera-und Kinowerke, Dresden, German Democratic Rep.

[21] Appl. No.: 809,050

[22] Filed: Jun. 21, 1977

[51] Int. Cl.² .............................................. G03B 17/20
[52] U.S. Cl. .......................................... 354/55; 354/56
[58] Field of Search ...................... 354/31, 54, 55, 56, 354/50, 51, 59, 23 R; 350/288

[56] References Cited
U.S. PATENT DOCUMENTS

| | | | |
|---|---|---|---|
| 3,465,660 | 9/1969 | Trankner et al. | 354/55 |
| 3,638,548 | 2/1972 | Kurihara | 354/55 |
| 3,872,484 | 3/1975 | Hashimoto et al. | 354/31 X |
| 3,884,584 | 5/1975 | Tsunekawa | 354/31 X |
| 3,936,159 | 2/1976 | Pavenick | 350/288 X |

*Primary Examiner*—Michael L. Gellner
*Attorney, Agent, or Firm*—William Anthony Drucker

[57] ABSTRACT

The exposure measuring system for single-lens reflex cameras, in which system the light passing through the objective lens is conveyed to the view finder eyepiece via a view finder reflex mirror, is provided with an additional mirror in the optical path of the camera, which additional mirror is partly translucent. A photo electric cell is pivotally mounted in order to be movable by linkage coupled with the reflex-mirror so that in one position during image viewing the cell receives light from the reflex mirror for light measurement and in another position during film exposure the cell receives light from the additional mirror for controlling exposure time.

2 Claims, 1 Drawing Figure

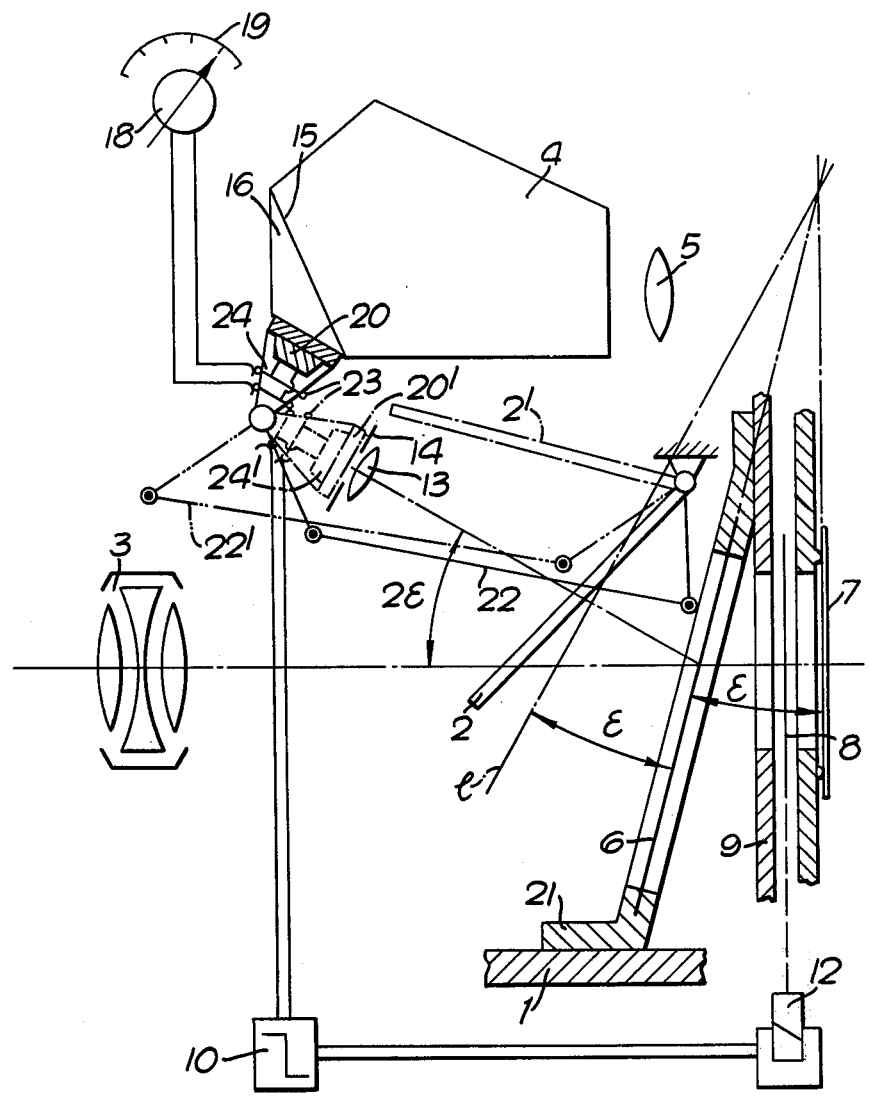

MEASURING AND CONTROL SYSTEM FOR SINGLE LENS REFLEX

BACKGROUND OF THE INVENTION

1. Field of the Invention

The present invention relates to a system for internal exposure measurement in single-lens reflex cameras, in which system the light passing through the taking lens is conveyed to the viewfinder eyepiece via a viewfinder mirror which interrupts the view through the viewfinder during the exposure process.

2. Description of the Prior Art

In known cameras of this kind the photo-electric converter is illuminated via the view finder mirror, which latter, however, when the shutter is released, is pivoted in such a way that the photo-electric converter no longer receives any measuring light. For the purposes of correct exposure time formation in accordance with the brightness during the taking operation, therefore, expensive electrical switching systems are provided by which the exposure value measured prior to the shutter release is stored up for the duration of the exposure process in the said taking operation. Systems are also known in which the marginal zone of the gate is used as a site for a photo-sensitive cell. This system, however, necessitates excessively large marginal zones, with a disadvantageous effect on the size of the gate. Furthermore, unintentional and uncontrollable reflection phenomena occur on the front side of the photo-electric cell. It has also been proposed that a marginal zone facing towards the taking lens and surrounding the gate should be constructed as a hollow mirror, its optical axis being inclined in respect of that of the taking lens and guiding part of the light penetrating the said lens onto a photo-electric converter. In this system only the marginal zones of the desired photographic image are measured, and this may lead to incorrect exposures if the light and shadow components prevailing in the marginal zones deviate excessively from the light and shadow components of the picture as a whole.

SUMMARY OF THE INVENTION

The present invention preferably enables the aforementioned drawbacks to be avoided by an improved system for the illumination of the photo-electric converter.

According to the invention there is provided an exposure measuring and control system for a single-lens reflex camera having an optical path for light to pass therethrough for defining an image at a film gate and a reflex mirror pivotable between a viewing position and position out of the optical path during exposure, comprising a partly translucent mirror arranged in the optical path, a photo electric cell mounted for movement into a first position for receiving light reflected by said reflex mirror with the latter in the viewing position and into a second position for receiving light reflected from said partly translucent mirror, a change-over switch which switches to a first position when said photo-electric cell is in its first position and to a second position when said photo electric cell is in its second position, a measuring circuit including an indicator for exposure times, connected by said change-over switch to said photo electric cell when said change-over switch is in its first position, and a control circuit for determining the exposure time of the camera, connected by said change-over switch to said photo electric cell when said change-over switch is in its second position.

Constructional embodiments of the present invention will now be described, by way of example, with reference to the accompanying drawings, wherein:

BRIEF DESCRIPTION OF THE DRAWINGS

The accompanying drawing is a schematic view showing an embodiment of the exposure measuring system in which a photo electric cell is pivotally mounted within a camera.

DESCRIPTION OF THE PREFERRED EMBODIMENTS

The pivotable viewfinder mirror 2, which is movable alternately into the viewfinder position and into the taking position 2', is mounted in the camera housing 1, not shown separately. The light rays passing through the taking lens 3 are conveyed from the viewfinder mirror 2 via the prism 4 to the eyepiece 5. Behind the partially mirror-coated surface 15 of the prism 4 is the measuring prism 16 with the photo-electric cell 17, which is connected to a galvanometer 18; opposite to the indicator of the galvanometer 18 is the scale 19 with values for exposure times. The gate 9 is situated, as viewed in the direction of the light, in front of the film 7 and the shutter 8. The measuring mirror 6, which is slightly (about 15%) mirror-coated, and which is inclined in relation to the film 7 by the angle $\epsilon$, is situated in front of the said gate. The measuring mirror 6 takes the form of a foil mirror and is clamped in the frame 21. The angle of inclination $\epsilon$ of the measuring mirror 6 in relation to the gate 9 is smaller than that of the viewfinder mirror 2 in the viewfinder position.

The photo-electric cell 20 (preferably a low-inertia photo diode) is mounted on a pivotable bar 24 and is thus pivotable away from the measuring prism 16 into a control position 20' in which the photo-electric cell 20 can be illuminated by the measuring mirror 6; by the switch-over contacts 23 mounted on the bar 24 the photo-electric cell 20 can be alternately connected up to the galvanometer 18 or to the exposure time circuit 10, of which the control magnet 12 limits the duration of the opening of the shutter 8. In front of the cell 20, occupying the control position 20', is the collecting lens 13, which receives the image, forming in the plane 1, of the subject. The image mask 14 associated with the collecting lens 13 and mounted on the front surface of the photo-electric cell 20 vignettes the image of the subject in accordance with the size of the gate 9.

The new system operates as follows:

When the viewfinder mirror 2 is in the viewfinder position the path of the rays passing through the taking lens 3 is conveyed into the prism 4, so that the photographer can observe the viewfinder image through the eyepiece 5, and the photo-electric information cell 20 is illuminated. As a result of the deflection of the indicator needle of the measuring mechanism 18 the photographer is able to take a reading, on the time scale 19, of the exposure time which will result, with the prevailing brightness, after the release of the shutter.

After the release of the camera shutter the viewfinder mirror 2 is pivoted into the taking position 2' and the illumination of the gate 9 with the measuring mirror 6 situated in front of it thus enabled to take place. The bar 24 is pivoted together with the viewfinder mirror 2, via the connecting rod 22. The photo-electric cell 20 is thus moved into the control position 20', in which process said photo-electric cell 20 is electrically separated from the galvanometer 18 and connected up to the exposure time circuit 10. The exposure of the film 7 commences with the opening movement of the shutter 8. The closing movement of the shutter 8 is set up by the time circuit 10, via the control magnet 12, and the exposure of the film 7 thus terminated at the right moment for the brightness prevailing. On the return of the viewfinder mirror 2 to the viewfinder position the photo-electric 20, by pivoting the plate 24, is separated from the exposure time circuit 10 and once again connected up to the galvanometer 18.

We claim:

1. An exposure measuring and control system for a single-lens reflex camera having an optical path for light to pass therethrough for defining an image at a film gate and a reflex mirror pivotable between a viewing position and position out of the optical path during exposure, comprising:
    (a) a partly translucent mirror arranged in the optical path,
    (b) a photo electric cell mounted for movement into a first position for receiving light reflected by said reflex mirror with the latter in the viewing position and into a second position for receiving light reflected from said partly translucent mirror,
    (c) a change-over switch which switches to a first position when said photo electric cell is in its first position and to a second position when said photo electric cell is in its second position,
    (d) a measuring circuit including an indicator for exposure times, connected by said change-over switch to said photo electric cell when said change-over switch is in its first position, and
    (e) a control circuit for determining the exposure time of the camera, connected by said change-over switch to said photo electric cell when said change-over switch is in its second position.

2. An exposure measuring and control system according to claim 1, including a pivotally mounted bar supporting said photo electric cell and transmission means connecting said bar with the reflex mirror.

* * * * *